United States Patent [19]

Chateauneuf et al.

[11] Patent Number: 4,570,961
[45] Date of Patent: Feb. 18, 1986

[54] MULTI PURPOSE TRANSPORT CART

[76] Inventors: Robert Chateauneuf, 534 Mercier, St. Jean sur Richelieu, Québec, Canada, J3B 6J6; Guy Chateauneuf, 465 Mgr Langis, Apt. 705, Rimouski, Quebec, Calif.X

[21] Appl. No.: 728,930
[22] Filed: Apr. 30, 1985
[51] Int. Cl.⁴ .............................................. B62B 1/20
[52] U.S. Cl. ................... 280/47.18; 280/30; 280/47.26; 280/47.33; 280/655
[58] Field of Search ............... 280/47.18, 47.26, 47.28, 280/47.31, 47.32, 30, 47.33

[56] References Cited
U.S. PATENT DOCUMENTS

| | | | |
|---|---|---|---|
| 21,551 | 9/1909 | Cayless | 280/47.18 |
| 1,475,785 | 11/1923 | Bergstrom | 280/47.18 |
| 2,461,353 | 2/1949 | Stelzer | 280/47.31 |
| 3,104,890 | 9/1963 | Hill | 280/47.18 |
| 3,661,414 | 5/1972 | Roth | 280/47.13 |
| 3,893,699 | 7/1975 | Morris | 280/47.13 |
| 4,048,735 | 9/1977 | Brunty | 294/51 |
| 4,341,393 | 7/1982 | Gordon et al. | 280/47.28 |
| 4,362,309 | 12/1982 | Stamper | 280/47.33 |

Primary Examiner—David M. Mitchell
Assistant Examiner—Eric Culbreth
Attorney, Agent, or Firm—Robic, Robic & Associates

[57] ABSTRACT

A front wheel-mounted cart having a chassis including a pair of forward side members and a pair of rearward side members, the side members of one pair telescoping into the side members of the other pair. It then serves as a truck for transporting bulky loads. A barrow may be mounted on the chassis in a removable manner by the telescoping action of the chassis side members. The barrow has a handle bar which, when in one position and secured to the chassis, serves to move the cart about and, once the barrow is freed from the chassis, serves for using the barrow as a shovel by pivoting the handle into a shoveling position.

10 Claims, 7 Drawing Figures

MULTI PURPOSE TRANSPORT CART

The present invention relates to a multi-purpose domestic transport cart that can be generally classified in the field of wheelbarrows.

Presently known wheelbarrows are generally made up of a concave bucket, having one forward wheel, supporting rear legs and two handles. Of arduous handling, they are usually used by men and moving them about requires strainious efforts, the load being carried resting on a single wheel and on the two handles. Holding it constantly in equilibrium also requires sustained efforts. The load is usually pushed by the user while it would often be easier to pull it. The conception of present wheelbarrows makes transportation in both directions very laborious and not very practical. Because of the position of the central wheel, front unloading is also difficult and that is why the barrow is more often unloaded laterally.

The conventional wheelbarrow is used since the invention of the wheel and appears to have been improved very little. Because of its cumbersome design, it is awkward to store and put away. In brief, it can be said that known wheelbarrows are outmoded and obsolete.

On the other hand, the push-type snow shovel that is found on the market is practical but is useful only about three months of the year after which it has to be put away and becomes cumbersome.

Also known and of much use are telescopic trucks, for domestic use, that have recently come on the market and that are practical for moving bulky and heavy loads such as electric ranges, refrigerators or the like. Used occasionally, such a truck has been favorably accepted as very practical by small home-owners as well as by tenants.

An object of the present invention lies in the provision of a multi-purpose transport cart having improved and new features that give home occupants or small businessmen a practical and precious tool at low cost. Effectively, the invention is a simple, practical and low-coast way of improving transportation of loads around the house the year long.

More specifically, the multi-purpose transport cart of the invention is a new type of wheelbarrow combining three different apparatuses into one: a telescoping truck, that can be used for moving bulky loads, over which a barrow can be removably secured when it is desired to transport particulate material such as sand or earth and which, when free from the truck, can be turned into a snow shovel of the push type.

The snow shovel thus becomes the bucket of the wheelbarrow when fixed onto the chassis of the truck. The cart of the invention is conceived in such a way that the barrow can be most simply secured and freed from the truck chassis without the use of tools and without efforts. Once removed, the bucket or barrow can become a snow shovel most simply by pivoting its handle bar which is the same as the handle of the wheelbarrow when the barrow is mounted on the truck.

Accordingly, the invention is broadly claimed herein as a transport cart comprising: a chassis having a forward wheel-mounted end part and a rearward wheelless end part, each part including a pair of side members with the side members of one pair being telescopically slidable in the side members of the other pair whereby selectively to adjust the length of the chassis and means releasably locking the side members in one of at least two selectible lengths; a load-abutment member upstanding from the front ends of side members of the forward part, transversely thereof; support leg means projecting down from the rear ends of the side members of the rearward part; a barrow mounted on the side members and against the load-abutment member, the barrow including a bottom wall having a rear edge, a forward wall upstanding from the bottom wall at the front thereof and butting against the abutment member, and side walls joining the bottom wall and forward wall; means releasably interconnecting the barrow forward wall and load-abutment member; and locking clips on the side members of the chassis rearward end part engaging the rear edge of the barrow bottom wall for holding, along with the interconnecting means, the barrow releasably secured to the side members and for freeing the barrow when the telescoping side members are moved away from one another.

The description of a preferred embodiment of the invention now follows having reference to the appended drawing wherein.

Figure 1:
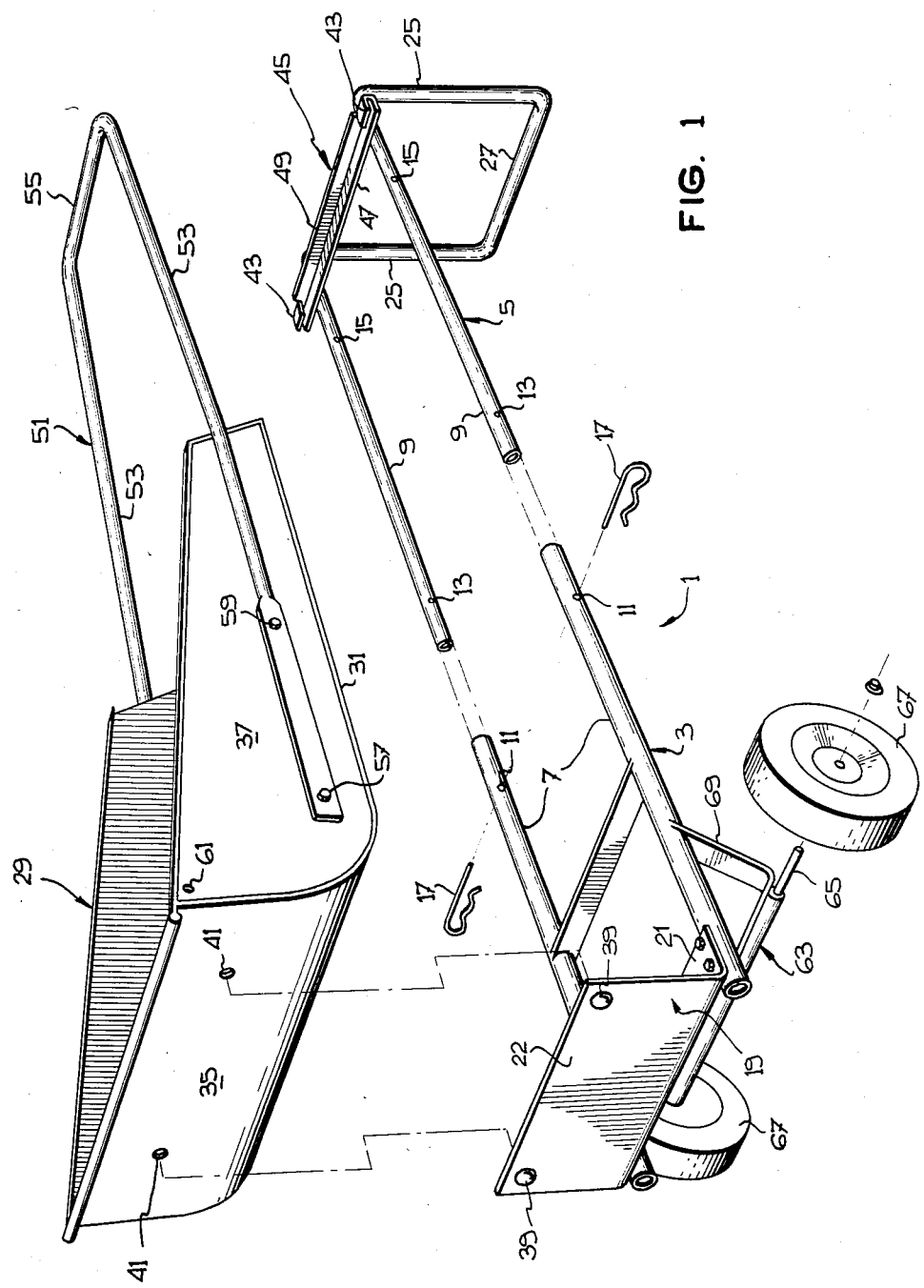
FIG. 1 is a perspective exploded view of a transport cart made according to the teaching of the present invention.
Figure 2:
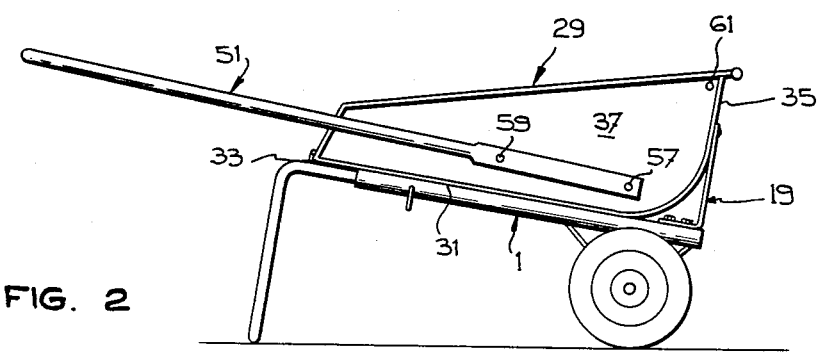
FIG. 2 is a side elevation view of the cart of FIG. 1.

As best shown in FIGS. 1 and 2, the transport cart comprises a chassis 1 having a forward wheel-mounted end part 3 and a rearward end part 5. Each of parts 3 and 5 includes a pair of parallel tubular side members 7, 9, the side members of one pair being telescopically slidable in the side member of the other pair. In this case, the side members 7 are hollow tubular members and the side members 9 are also tubular and may be hollow, as shown. With this construction and as will be appreciated, it is possible selectively to adjust the length of the chassis 1, means being suitably provided for releasably locking the side members 7, 9, in one of at least two selectible lengths. More specifically, as shown, the side members 7 have through diametral apertures 11, the side members 9 having, on the other hand, two pairs of diametral apertures 13 and 15. Thus, the rearward part 5 may be slid until either of the pair of diametral apertures 13, 15 come into registry with the diametral apertures 11. Standard spring locking pins are then slid through the registering holes to hold parts 3 and 5 in the selected length position of the chassis 1.

A load-abutting member 19 has a horizontal flange 21 secured at the forward extremities of the side members 7 in any known manner such as by being bolted thereto. The upstanding flange 22 of the member 19 serves to receive bulky loads when the cart is used as a truck, as will be seen hereinafter.

The rearward end part 5, on the other hand, is wheelless and is formed with support leg means that project down from the rear ends of the side members 9. This support leg means is formed by integral extensions of the side members 9, the extensions comprising a pair of parallel straight side legs 25 joined by a straight bight 27 intended to rest on the ground in loading position of the cart. It will also be appreciated that this U-shaped support 25, 27, may be used as a handle for pushing the cart when used as a truck, better illustrated in FIG. 6.

Figure 3:
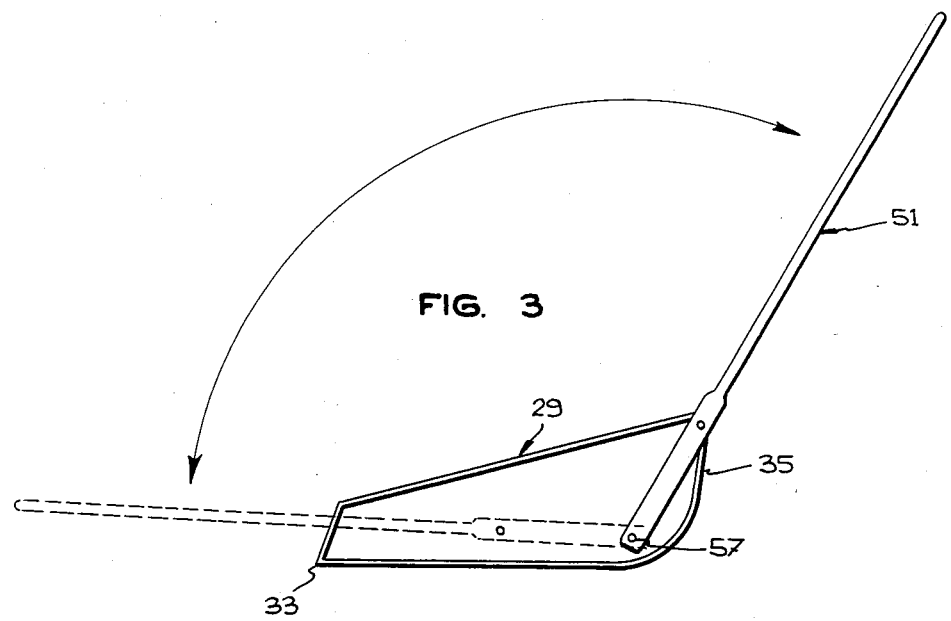
FIG. 3 is a side elevation view of the barrow of the cart when used as a snow shovel.

Mounted on the side members 7, 9, and against the load-abutting member 19, is a barrow 29 formed by a bottom wall 31, having a straight rear edge 33 (see FIGS. 2 and 3), by a forward wall 35 upstanding from the bottom wall 31 and joined thereto by a curved portion, as shown, and by side walls 37 joining the bottom wall 31 and the forward wall 35. As shown in FIG. 2 and when the cart is used as a wheel barrow, the forward wall 35 butts against the abutment member 19.

Figure 4:
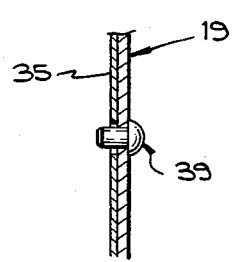
FIG. 4 is a cross-sectional view of a portion of the cart of FIG. 2 illustrating the releasable interconnecting means between the cart barrow and the load-abutting member.

Means releasably interconnect the forward wall 35 of the barrow and the abutment member 19. In this case, the interconnecting means are pins 39 (see FIGS. 1 and 4) that project rearwardly from the load abutment member 19. The forward wall 35 of the barrow 29, on the other hand, is formed with holes 41 which, in assembled condition of the barrow 29 on the chassis 1, engage around the pins 39. This is the situation illustrated in FIGS. 2 and 4. The pins 39 may be welded or otherwise secured to the vertical flange 22 of the load-abutment member 19 or may simply be tightly screwed across it. It will thus be appreciated that the barrow 29 may simply be removed from the chassis 1 by rearward pulling on the side members 9 to free the clips 43.

Once the barrow 29 is secured in position at the forward end of the cart by having the pins 39 inserted into the holes 41, it is held tightly against the chassis 1 at the rear end thereof by means of the locking clips 43 provided on the side members 9 of the chassis rearward end part 5. The clips 43 engage the rear edge 33 of the barrow bottom wall 31 for holding, along with the interconnecting pins 39, the barrow 29 releasably secured to the side members 7, 9, and for freeing the barrow 29 when the telescoping side member 7, 9, are moved away from one another, as will easily be gathered from a study of FIGS. 1 and 2.

In the embodiment illustrated in FIG. 1, there is provided a bracing angle member 45 which is secured to the rear ends of the side members 9, transversely of the rearward end part 5. The angle member 45 has a horizontal and an upright flange 47, 49, the upright flange 49 further having a portion at either end thereof bent forwardly over the horizontal flange whereby to define, with the corresponding portion of the horizontal flange 47, the locking clips 43 previously mentioned.

Figure 5:
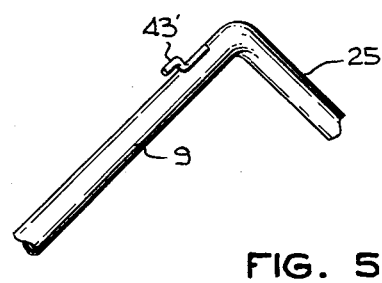
FIG. 5 is a part view of one side member of the cart.

As shown in FIG. 5, Z-shaped clips 43' may also be provided which are solidly secured, as by welding, on the side members 9.

When used as a wheelbarrow as illustrated in FIG. 2, the transport cart may be moved about by means of a U-shaped handle bar 51 having a pair of side arms 53 turning, at the rearward end, toward one another to form a gripping portion 55.

The forward free ends of the side arms 53 are pivotally mounted, at 57, to the barrow side walls 37 adjacent the bottom wall 31. Any conventional pivot means may be used such as a loose double-headed pin.

Bolt means releasably lock the side arms 53 to the side walls in a first position, which is that of FIGS. 1 and 2, where the handle bar 51 lies essentially parallel to the bottom wall 31 of the barrow 29.

Such bolt means 59 include bolts extending through first lock holes (not apparent in the drawings) through the barrow side walls 37. Additionally, each barrow side wall 37 is formed with a second lock hole 61 at the top thereof and adjacent the forward wall 35, slightly forwardly of the pivot 57, the holes 61 essentially having the same size as the first lock holes of the bolt means 59. The distances between the first and second holes 59, 61, and the pivot 67 are equal so that the handle bar 51 may be unlocked from the first position of FIGS. 1 and 2, pivoted about the pivot 57 and locked into a second position wherein the bolts of the bolt means 59 extend through the second holes 61, which is the position shown in FIG. 3 when the barrow 29 is to be used as a snow shovel.

Returning to FIG. 1, the chassis 1 is forwardly supported by any conventional wheel suspension comprising a transverse shaft 63 extending, at the ends thereof, into stub axles 65 about which wheels 67 are journaled. The shaft 63 is made solid with the corresponding end of the forward side members 7 by means of V-shaped brackets 69.

Figure 6:
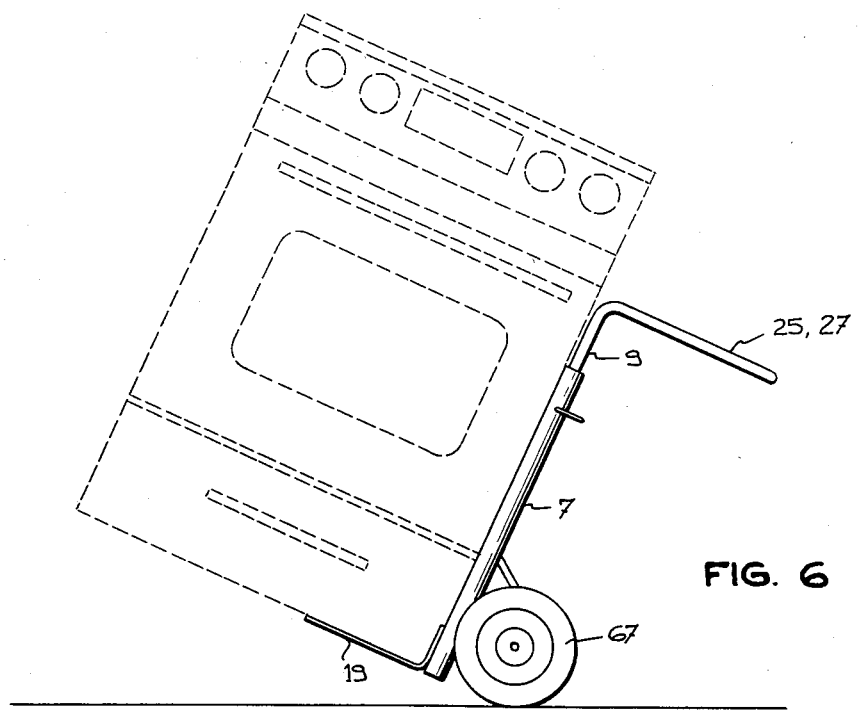
FIG. 6 is a side elevation view of the cart when used as a truck for transporting a bulky load.

Referring to FIG. 6, it will be seen that the truck, that is the cart without the barrow 29, can be used for carrying heavy bulky loads, such as an electric range.

Figure 7:
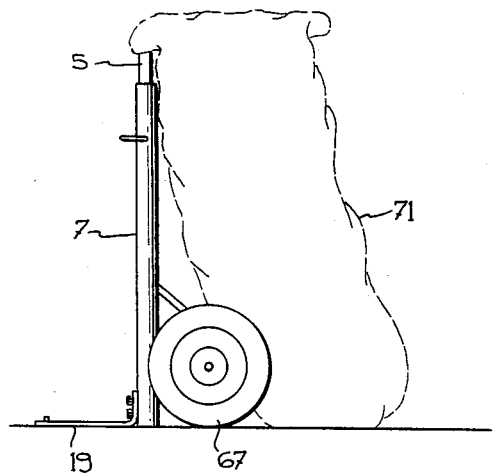
FIG. 7 is a side elevation view of the truck, in upright position, intended to support a refuse collecting bag.

In FIG. 7, the cart is used in upright stationary position where it can be seen that, with the side members, 7, 9, standing vertical, the load-abutting member 19 as well as the wheels 67 both engage the ground. It will be seen also that the opening defined by the support legs 25, 27, is suitable for the mounting thereof of a refuse collecting bag 71.

I claim:

1. A transport cart comprising: a chassis having a forward wheel-mounted end part and a rearward wheelless end part, each part including a pair of side members with the side members of one pair being telescopically slidable in the side members of the other pair whereby selectively to adjust the length of said chassis and means releasably locking said side members in one of at least two selectible lengths; a load-abutment member upstanding from the front ends of said side members of said forward part, transversely thereof; support leg means projecting down from the rear ends of said side members of said rearward part; a barrow mounted on said side members and against said load-abutment member, said barrow including a bottom wall having a rear edge, a forward wall upstanding from said bottom wall at the front thereof and butting against said abutment member, and side walls joining said bottom wall and forward wall; means releasably interconnecting said barrow forward wall and load-abutment member; and locking clips on said side members of said chassis rearward end part engaging said rear edge of said barrow bottom wall for holding, along with said interconnecting means, said barrow releasably secured to said side members and for freeing said barrow when said telescoping side members are moved away from one another.

2. A transport cart as claimed in claim 1, wherein said support leg means is formed by extensions of said side members of said rear part, in the shape of a U.

3. A transport cart as claimed in claim 2, wherein said U-shaped extensions comprise a pair of parallel straight side legs joined by a straight bight.

4. A transport cart as claimed in claim 1, wherein said interconnecting means are pins projecting rearwardly from said load-abutment member and wherein said barrow forward wall is formed with holes engaging around said pins.

5. A transport cart as claimed in claim 1, comprising: a bracing angle member secured over said side members of said chassis end part, transversely and at the rear end thereof; said angle member having a horizontal and an upright flange, said upright flange having a portion at either end bent forwardly over said horizontal flange to define said locking clips.

6. A transport cart as claimed in claim 1, wherein said locking clips are hooks secured to said side members of said chassis end part.

7. A transport cart as claimed in claim 1, wherein said barrow comprises: a U-shaped handle bar having a pair of side arms; means pivotally mounting the free ends of said side arms to said barrow side walls adjacent said barrow bottom wall; bolt means releasably locking said side arms to said side walls in a first position where said bar is essentially parallel to said bottom wall, said bolt means including bolts extending through first lock holes in said barrow side walls; wherein each of said barrow side walls is formed with a second lock hole at the top thereof and adjacent said forward wall, slightly forwardly of said pivot means, and having essentially the same size as said first lock holes, and wherein the distances between said first and second holes and said pivot means are equal whereby said handle bar may be unlocked from said first position, pivoted about said pivot means and locked into a second position wherein said bolts of said bolt means extend through said second holes.

8. A transport cart as claimed in claim 7, wherein said support leg means is formed by extensions of said side members of said rear part, in the shape of a U.

9. a transport cart as claimed in claim 8, wherein said U-shaped extensions comprise a pair of parallel straight side legs joined by a straight bight.

10. A transport cart as claimed in claim 8, wherein said support leg means defines an opening of a size suitable for the mounting thereon of a refuse collecting bag.

* * * * *